(12) United States Patent
Kang et al.

(10) Patent No.: US 12,311,802 B2
(45) Date of Patent: May 27, 2025

(54) SWITCHING CONTROL SELECTION LOGIC IN HIGH-SPEED LOOP IN MODACS

(71) Applicant: GM Global Technology Operations LLC, Detroit, MI (US)

(72) Inventors: Jun-mo Kang, Ann Arbor, MI (US); Dave Gerard Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 17/882,050

(22) Filed: Aug. 5, 2022

(65) Prior Publication Data

US 2024/0042895 A1 Feb. 8, 2024

(51) Int. Cl.
| | |
|---|---|
| *H02J 7/00* | (2006.01) |
| *B60K 6/48* | (2007.10) |
| *B60L 50/60* | (2019.01) |
| *B60L 58/12* | (2019.01) |
| *B60L 58/19* | (2019.01) |
| *B60L 58/22* | (2019.01) |
| *B60L 58/24* | (2019.01) |
| *B60K 6/28* | (2007.10) |

(52) U.S. Cl.
CPC ............... *B60L 58/22* (2019.02); *B60K 6/48* (2013.01); *B60L 50/60* (2019.02); *B60L 58/12* (2019.02); *B60L 58/19* (2019.02); *B60L 58/24* (2019.02); *B60K 6/28* (2013.01); *H02J 7/0014* (2013.01)

(58) Field of Classification Search
CPC .......... B60L 58/12; B60L 58/19; B60L 58/22; B60L 58/24; B60L 50/60; H02J 7/0014; B60K 6/28; B60K 6/48
USPC .................................... 320/104, 109; 701/22
See application file for complete search history.

(56) References Cited

U.S. PATENT DOCUMENTS

2023/0036188 A1\* 2/2023 Schmidt ............. G06Q 20/3224

\* cited by examiner

*Primary Examiner* — Zixuan Zhou
(74) *Attorney, Agent, or Firm* — CANTOR COLBURN LLP

(57) ABSTRACT

A vehicle, system and method of operating a battery having a plurality of modules, each module having a plurality of strings. The vehicle includes the battery. A processor operates the plurality of modules in a first phase of a mode of operation, calculates a model-predicted path vector for the first phase based on a time for reducing a difference between states of charges of the plurality of strings, selects between the model-predicted path vector and a default path vector based on an operating parameter of the battery, and switches operation of the plurality of modules from the first phase to a second phase using the selected one of the model-predicted path vector and the default path vector.

20 Claims, 14 Drawing Sheets

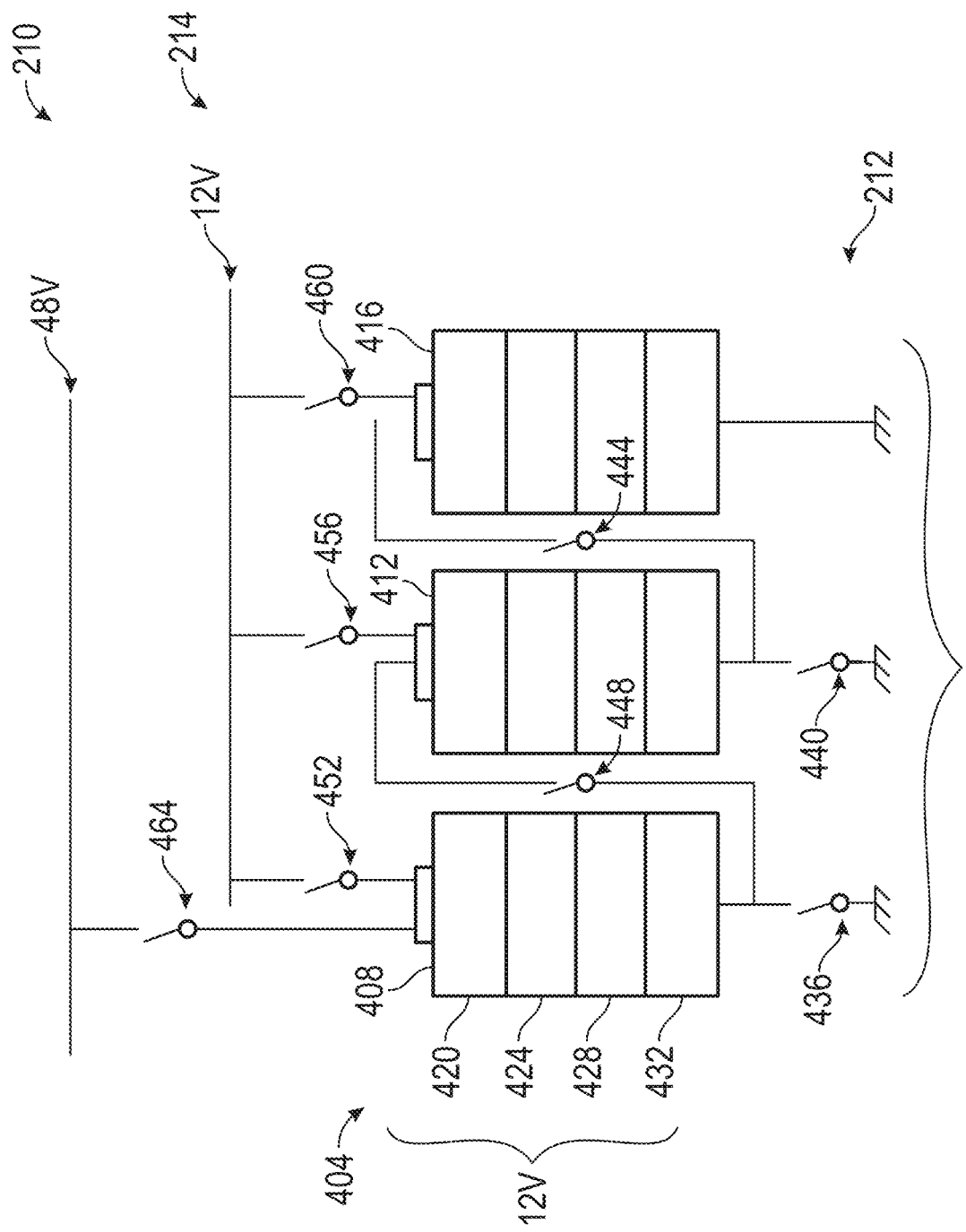

SWITCHING CONTROL SELECTION LOGIC IN HIGH-SPEED LOOP IN MODACS

INTRODUCTION

The subject disclosure relates to operation of a Multiple Output Dynamically Adjustable Capacity System (MODACS) in a vehicle and, in particular, to a system and method for optimally operating the MODACS to provide power to the vehicle.

A MODACS is a power unit for a plurality of electrical units of the vehicle. The MODACS includes a plurality of energy storage strings that can be configured as needed to meet the changing power demands of the vehicle as required by the plurality of electrical units. Due to the different power demands, each energy storage string can be depleted at different rates. Thus, it is necessary to share the roles of supplying a power demand amongst a plurality of strings by rotating through the strings sequentially so that the depleted strings can be recharged. However, it is necessary to rotate power duties through the strings at a suitable rate that meets power demands without overheating the MODACS. Accordingly, it is desirable to provide a system and method for optimally switching the configurations of the strings within the MODACS.

SUMMARY

In one exemplary embodiment, a method of operating a battery having a plurality of modules, each module having a plurality of strings is disclosed. The plurality of modules are operated in a first phase of a mode of operation. A model-predicted path vector is calculated for the first phase based on a charging or discharging the strings for reducing a difference between states of charge of the plurality of strings. A selection is made between the model-predicted path vector and a default path vector based on an operating parameter of the battery. An operation of the plurality of modules is switched from the first phase to a second phase using the selected one of the model-predicted path vector and the default path vector.

In addition to one or more of the features described herein, the method further includes selecting the model-predicted path vector when the use of the model-predicted path vector satisfies a power requirement of the battery. The method further includes selecting the default path vector when the use of the model-predicted path vector does not satisfy the power requirement of the battery. The power requirement is based on a switching frequency at which switching power loss occurs. The operating parameter includes at least one of a temperature of the battery and a power demand on the battery. Switching the operation of the plurality of modules from the first phase to a second phase further includes flipping a switch between a first configuration that connects a default switching control module to the battery and a second configuration that connects a model-predicted switching control module to the battery. The method further includes selecting the default path vector when at least one of a mode of operation changes and a direction of power changes.

In another exemplary embodiment, a system for operating a battery having a plurality of modules, each module having a plurality of strings is disclosed. The system includes a processor configured to operate the plurality of modules in a first phase of a mode of operation, calculate a model-predicted path vector for the first phase based on a time for reducing a difference between states of charges of the plurality of strings, select between the model-predicted path vector and a default path vector based on an operating parameter of the battery, and switch operation of the plurality of modules from the first phase to a second phase using the selected one of the model-predicted path vector and the default path vector.

In addition to one or more of the features described herein, the processor is further configured to select the model-predicted path vector when the use of the model-predicted path vector satisfies a power requirement of the battery. The processor is further configured to select the default phase vector when the use of the model-predicted path vector does not satisfy the power requirement of the battery. The power requirement is based on a switching frequency at which switching power loss occurs. The operating parameter includes at least one of a temperature of the battery and a power demand on the battery. The processor is further configured to flipping a switch between a first configuration that connects a default switching control module to the battery and a second configuration that connects a model predicted switching control module to the battery. The processor is further configured to select the default path vector when at least one of a mode of operation changes and a direction of power changes.

In yet another exemplary embodiment, a vehicle is disclosed. The vehicle includes a battery having a plurality of modules, each module having a plurality of strings, and a processor. The processor is configured to operate the plurality of modules in a first phase of a mode of operation, calculate a model-predicted path vector for the first phase based on a time for reducing a difference between states of charges of the plurality of strings, select between the model-predicted path vector and a default path vector based on an operating parameter of the battery, and switch operation of the plurality of modules from the first phase to a second phase using the selected one of the model-predicted path vector and the default path vector.

In addition to one or more of the features described herein, the processor is further configured to select the model-predicted path vector when the use of the model-predicted path vector satisfies a power requirement of the battery. The processor is further configured to select the default phase vector when the actual mode duration use of the model-predicted path vector does not satisfy the power requirement of the battery. The power requirement is based on a switching frequency at which switching power loss occurs. The operating parameter includes at least one of a temperature of the battery and a power demand on the battery. The processor is further configured to flipping a switch between a first configuration that connects a default switching control module to the battery and a second configuration that connects a model predicted switching control module to the battery.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 is a functional block diagram of an example implementation of a battery module including a set of the switches;

DETAILED DESCRIPTION

Figure 1:
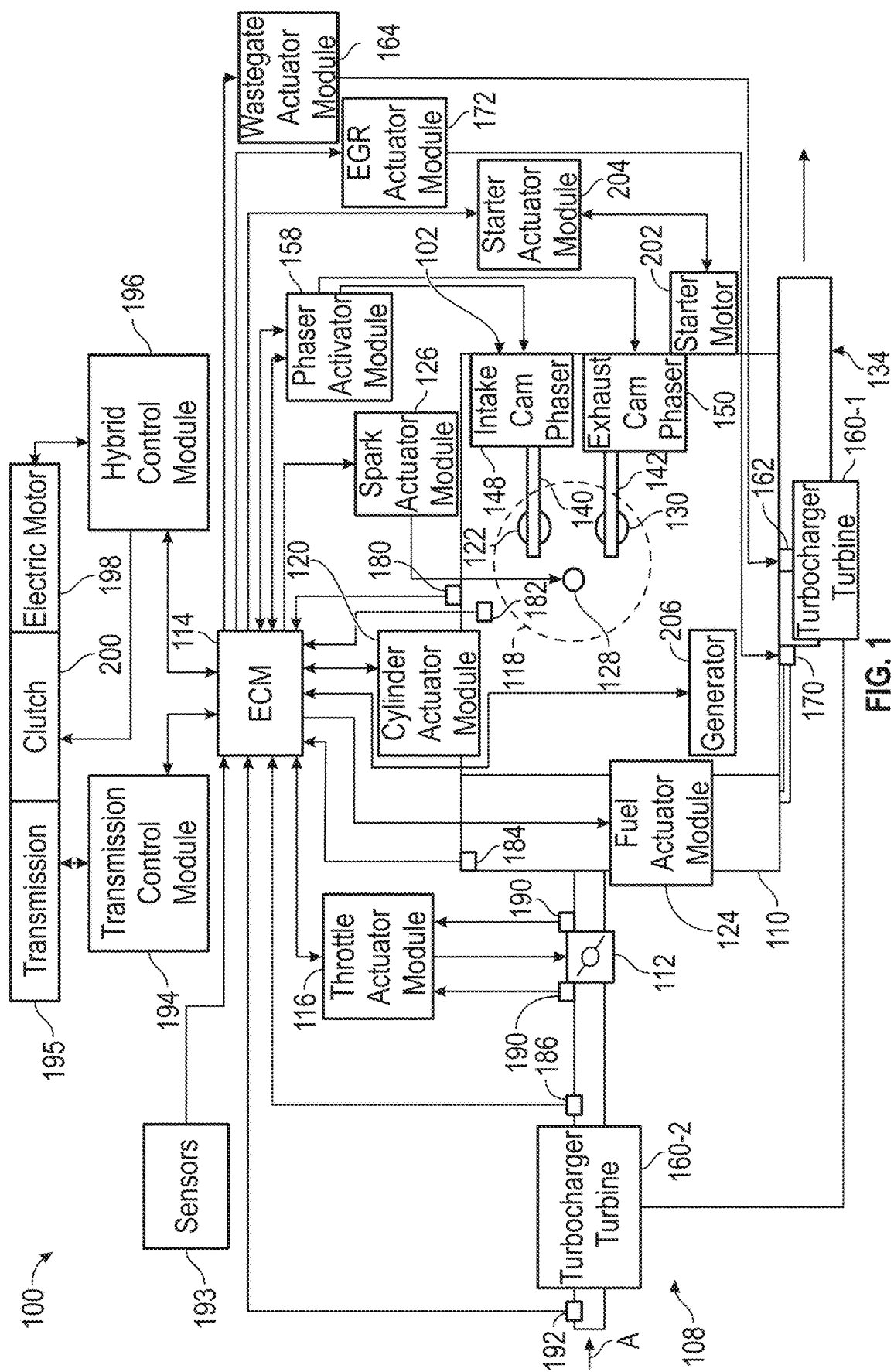
FIG. 1 shows a functional block diagram of an example powertrain system for a hybrid vehicle.

The following description is merely exemplary in nature and is not intended to limit the present disclosure, its application or uses. It should be understood that throughout the drawings, corresponding reference numerals indicate like or corresponding parts and features.

A battery has a first terminal on a housing of the battery for outputting a first operating voltage (e.g., 48 V) and a second output terminal on the housing for outputting a second operating voltage (e.g., 12 V). The battery may be a battery of a vehicle in an example. The battery includes a plurality of battery modules and a plurality of switches. Each battery module includes a plurality of battery strings, and each battery string includes a plurality of battery cells. The switches are configured to connect strings together in series to the first output terminal or individually to the second output terminal. The strings can also be disconnected from the first and second output terminals.

A model predictive controller (MPC) or another type of charge balancing controller uses estimates or measurements of states of charge (SOCs) of the battery strings and controls the switches to minimize SOC error across the battery strings and battery modules during operation in some power modes. This ensures that each battery string is charged and discharged as evenly as possible and maximizes battery life.

The temperature of a battery string or a battery module may deviate, however, from one or more other battery strings of its battery module or from one or more of the other battery modules. The present application involves selecting a method for managing temperatures of the battery strings and battery modules to minimize differences between temperatures of the battery strings and battery modules.

Referring now to FIG. 1, a functional block diagram of an example powertrain system 100 is presented for a hybrid vehicle. While the example of a hybrid vehicle is provided, the present application is applicable to non-vehicle applications and other types of vehicles (e.g., electric, internal combustion engine, etc.). The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow "A" into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air "A" from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC). During the exhaust stroke, the piston begins moving up from BDC and expels the byproducts of combustion through an exhaust valve 130. The byproducts of combustion "E" are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling an opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger includes a turbocharger compressor that is driven by the turbocharger turbine 160 and that compresses air leading into the throttle valve 112. A wastegate (WG) 162 controls exhaust flow through and bypassing the turbocharger turbine. Wastegates can also be referred to as (turbocharger) turbine bypass valves. The wastegate 162 may allow exhaust to bypass the turbocharger turbine 160 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. The turbocharger turbine 160 and the turbocharger compressor may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 (FIG. 2) to the electric motor 198 to cause the electric motor 198 to output positive torque. The battery is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted. In vehicles, such as electric vehicles and autonomous vehicles, the battery 208 can be used to supply self redundant power to various systems, such as automotive safety integrity level (ASIL) systems and advanced driver assistant systems (ADAS), as well as serve multiple output voltages (e.g., 12 and 48 volts)

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not applying pressure to the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together. In various implementations, one or more direct current (DC) to DC converters may be implemented.

Figure 2:
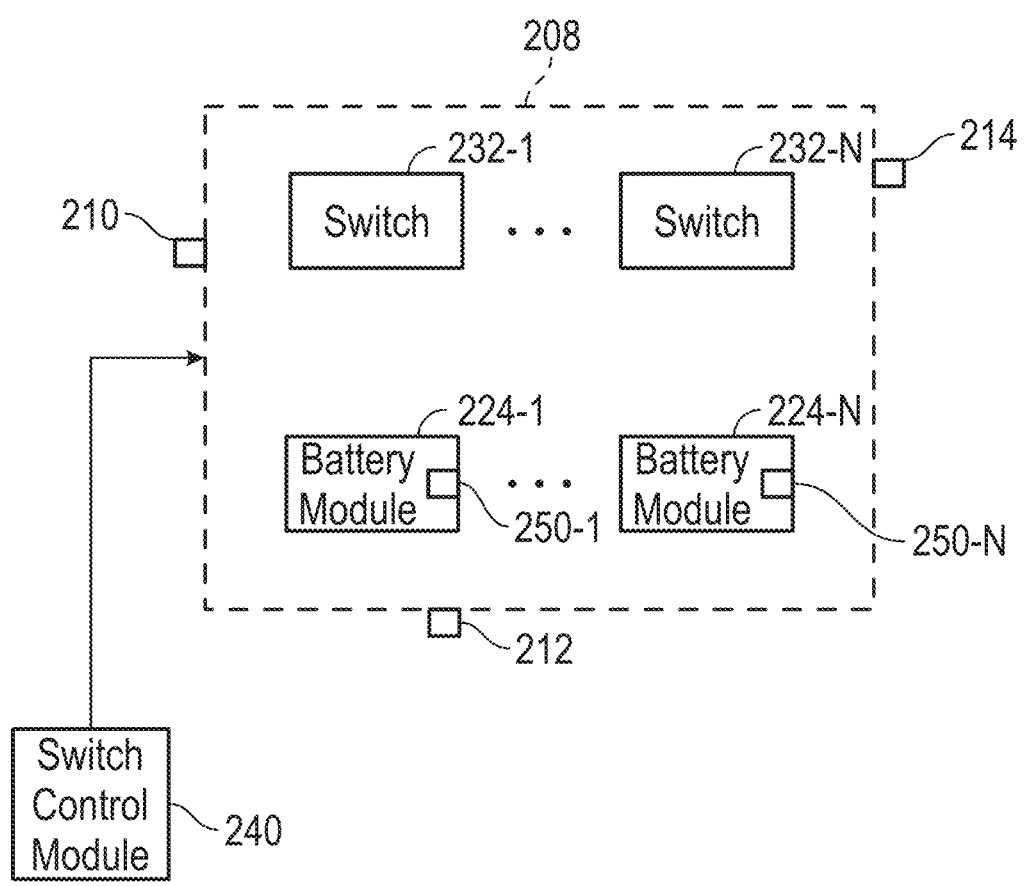
FIG. 2 is a functional block diagram of an example battery system of the vehicle.

FIG. 2 is a functional block diagram of an example battery system of the vehicle. The battery 208 has at least two (positive) output terminals and a negative terminal to provide at least two direct current (DC) operating voltages. For example only, the battery 208 may have a first positive (e.g., 48 Volt (V) nominal) terminal 210, a negative terminal 212, and a second positive (e.g., 12 V nominal) terminal 214. While the example of the battery 208 having a 48 V nominal operating voltage and a 12 V nominal operating voltage is provided, the battery 208 may have one or more other operating voltages.

The battery 208 includes a plurality of battery modules, such as a first battery module 224-1, ..., and an N-th battery module 224-N ("battery modules 224"), where N is an integer greater than or equal to 2. In various implementations, N may be equal to 2, 3, 4, 5, 6, 8, 10, 12, or another suitable number.

As discussed further below with respect to FIG. 4, each of the battery modules 224 includes multiple battery strings. Each battery string may be individually replaceable. The ability to individually replace the battery strings may enable the battery 208 to include a shorter warranty period and have a lower warranty cost. The battery strings are also individually isolatable, for example, in the event of a fault in a battery string. In various implementations, the battery 208 may have the form factor of a standard automotive grade 12 V battery.

The battery 208 includes a plurality of switches, such as first switches 232-1, ..., N-th switches 232-N (collectively "switches 232"). The switches 232 enable the battery strings of the battery modules 224 to be connected in series, parallel, or combinations of series and parallel to provide target output voltages and capacities at the output terminals.

A switch control module 240 controls the switches 232 to provide desired output voltages and capacities at the output terminals. The switch control module 240 controls the switches 232 using model predictive control (MPC) or another type of balancing control to as closely as possible balance the state of charges (SOCs) of the battery strings, as discussed further below. The switch control module 240 also controls the switches 232 based on balancing temperatures of the battery strings of each battery module and temperatures of the battery modules.

Figure 3A:
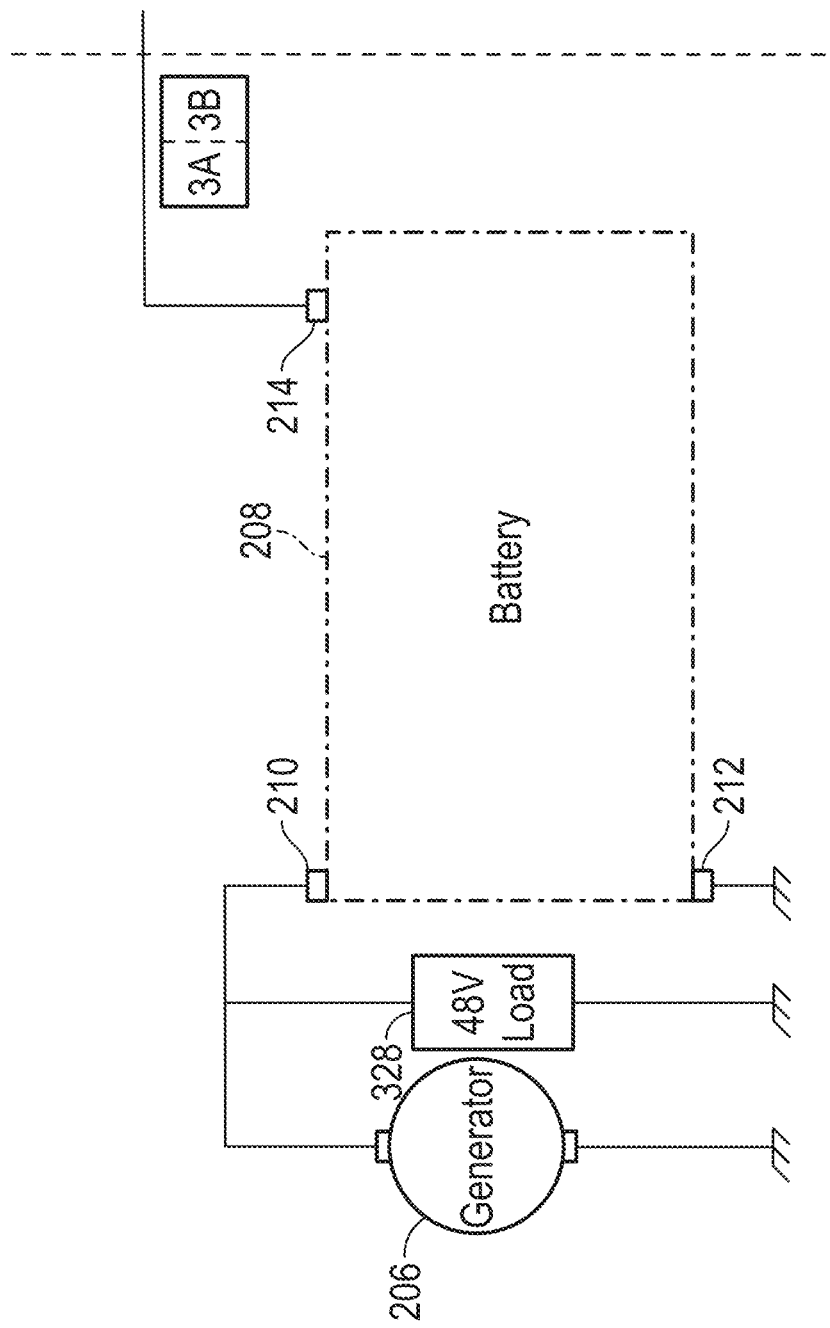
FIGS. 3A-3B are schematic diagrams including an example battery system including the battery.
Figure 3B:
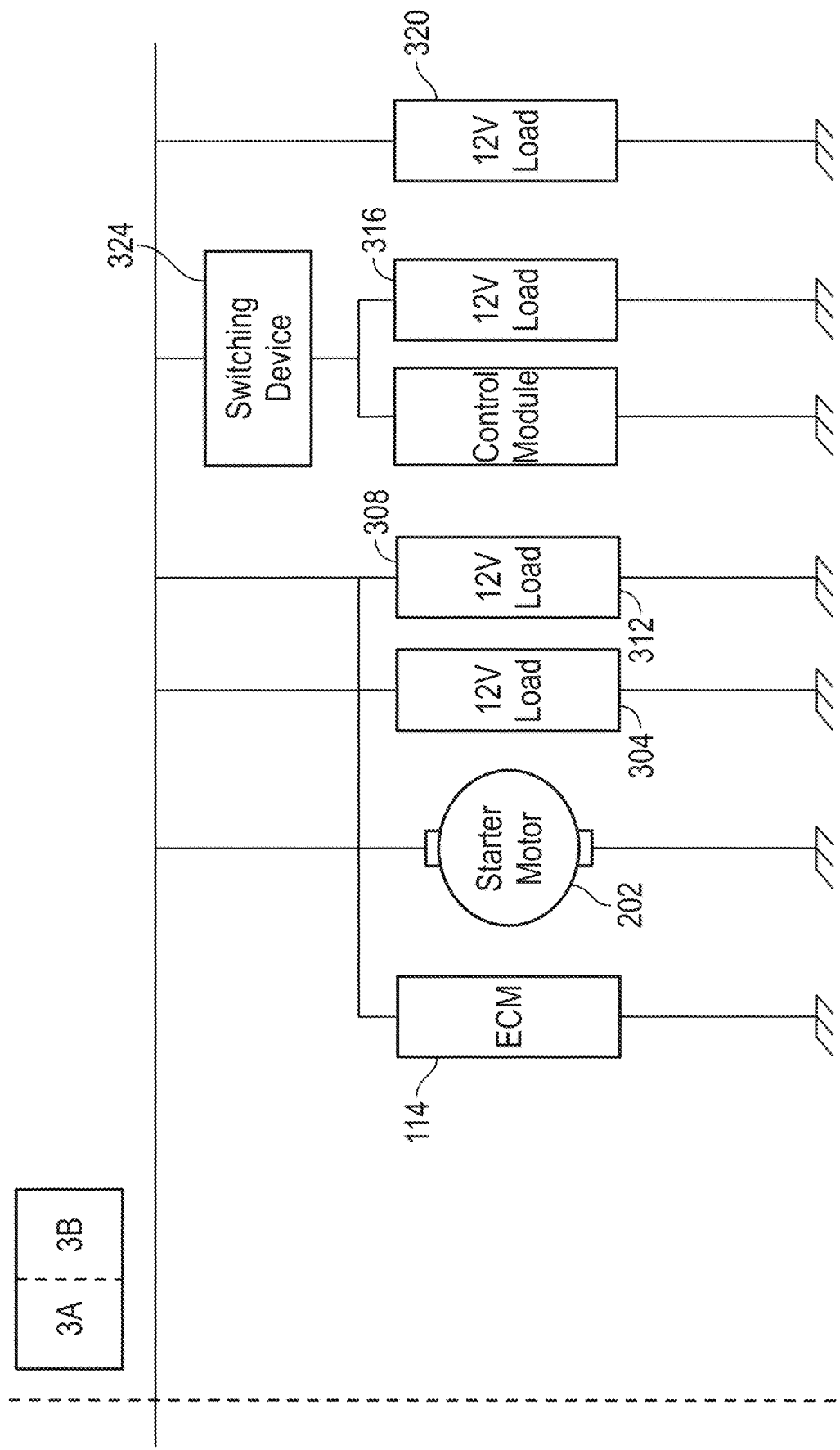

FIGS. 3A and 3B are schematic diagrams including an example battery system including the battery 208. Sets of the battery strings are connectable in series (via ones of the switches 232) to the first positive terminal 210 and the negative terminal 212 to provide a first nominal output voltage (e.g., 48 V) via the first positive terminal 210. Individual ones of the battery strings can be connected (via ones of the switches 232) to the second positive terminal 214 and the negative terminal 212 to provide a second nominal output voltage (e.g., 12 V) via the second positive terminal 214. How many of the battery strings are connected to the first positive terminal 210 and the second positive terminal 214 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second positive terminal 214. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be implemented.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to charge the battery 208.

Each of the switches 232 may be an insulated gate bipolar transistor (IGBT), a field effect transistor (FET), such as a metal oxide semiconductor FET (MOSFET), or another suitable type of switch.

FIG. 4 is a functional block diagram of an example implementation of one of the battery modules 224, numbered battery module 404, and one set of the switches 232. Each of the battery modules 224-1, ..., 224-N may be identical to battery module 404, and each set of the switches 232-1, ..., 232-N may be connected identically to that of the switches of the battery module 404.

The battery module 404 includes three battery strings, 408, 412, and 416. The battery strings 408-416 are identical and each include four battery cells 420, 424, 428, and 432. The battery cells 420-432 are connected in series to provide the second operating voltage (e.g., 12 V). Each of the battery cells 420-432 may be, for example, a 3 V battery cell or have another suitable voltage to provide the second operating voltage when the battery cells 420-432 are connected in series. The battery cells 420-432 may be, for example lithium ferrophosphate (LFP) battery cells or have another suitable chemistry.

Negative terminals of the battery strings 408-416 are connected to the negative terminal 212. The negative terminals of the battery strings 408 and 412 are connected to the negative terminal 212 via switches 436 and 440, respectively, when the switches 436 and 440 are closed. The switches 436 and 440 can open to disconnect the negative terminals of the battery strings 408 and 412 from the negative terminal 212. The negative terminal of the battery string 416 may be directly connected to the negative terminal 212.

The positive terminal of the battery string 416 is connected to the negative terminal of the battery string 412 such that the battery strings 412 and 416 are connected in series when switch 444 is closed. The switch 444 can be opened to disconnect the positive terminal of the battery string 416 from the negative terminal of the battery string 412. The positive terminal of the battery string 412 is connected to the negative terminal of the battery string 408 such that the battery strings 412 and 408 are connected in series when switch 448 is closed. The switch 448 can be opened to disconnect the positive terminal of the battery string 412 from the negative terminal of the battery string 408.

Switches 452, 456, and 460 respectively connect and disconnect the positive terminals of the battery strings 408, 412, and 416 to and from a first bus (e.g., 12 V bus) that is connected to the second positive terminal 214. Switch 464 connects and disconnects the positive terminal of the battery string 408 to and from a second bus (e.g., a 48 V bus) that is connected to the first positive terminal 210.

The switch control module 240 controls switching of the switches of each of the battery modules 224 (the set of switches). At any given time, the switch control module 240 may actuate the switches associated with a battery module such that the battery module is in an open (X) configuration, a series (S) configuration, or a parallel (P) configuration. FIG. 4 includes an example illustration of the battery module 404 in the open (X) configuration. When a battery module is in the open (X) configuration, all the battery strings of the battery module are disconnected from both the first positive terminal 210 and the second positive terminal 214.

Figure 5:
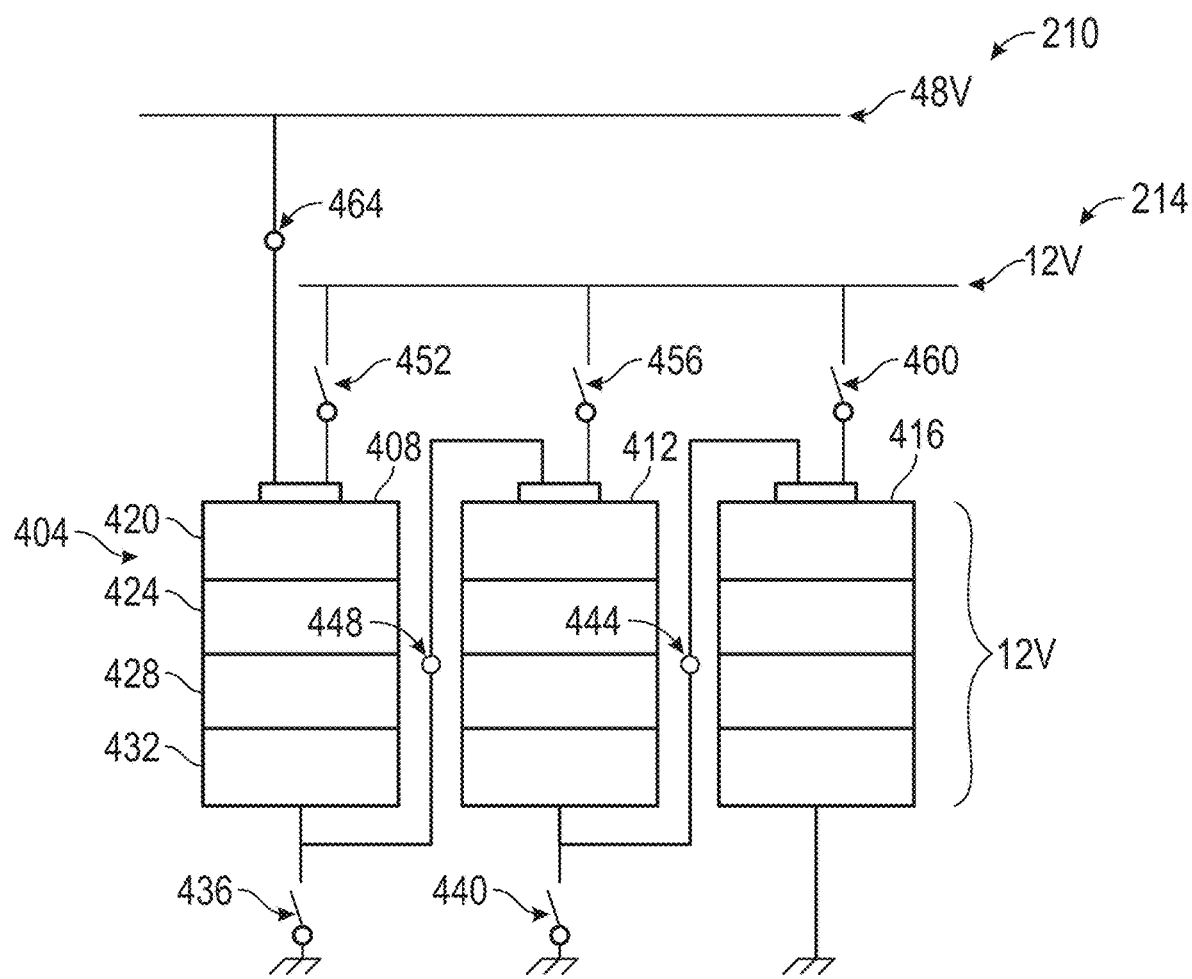
FIG. 5 includes an example illustration of the battery module in a series configuration.

FIG. 5 includes an example illustration of the battery module 404 in the series (S) configuration. When a battery module is in the series (S) configuration, all of the battery strings of the battery module are connected in series and to the first positive terminal 210. This is accomplished by closing switches 444, 448, and 464, and opening all of the other switches 436, 440, 452, 456, 460. None of the battery strings is connected to the second positive terminal 214 when the battery module is in the series (S) configuration.

Figure 6:
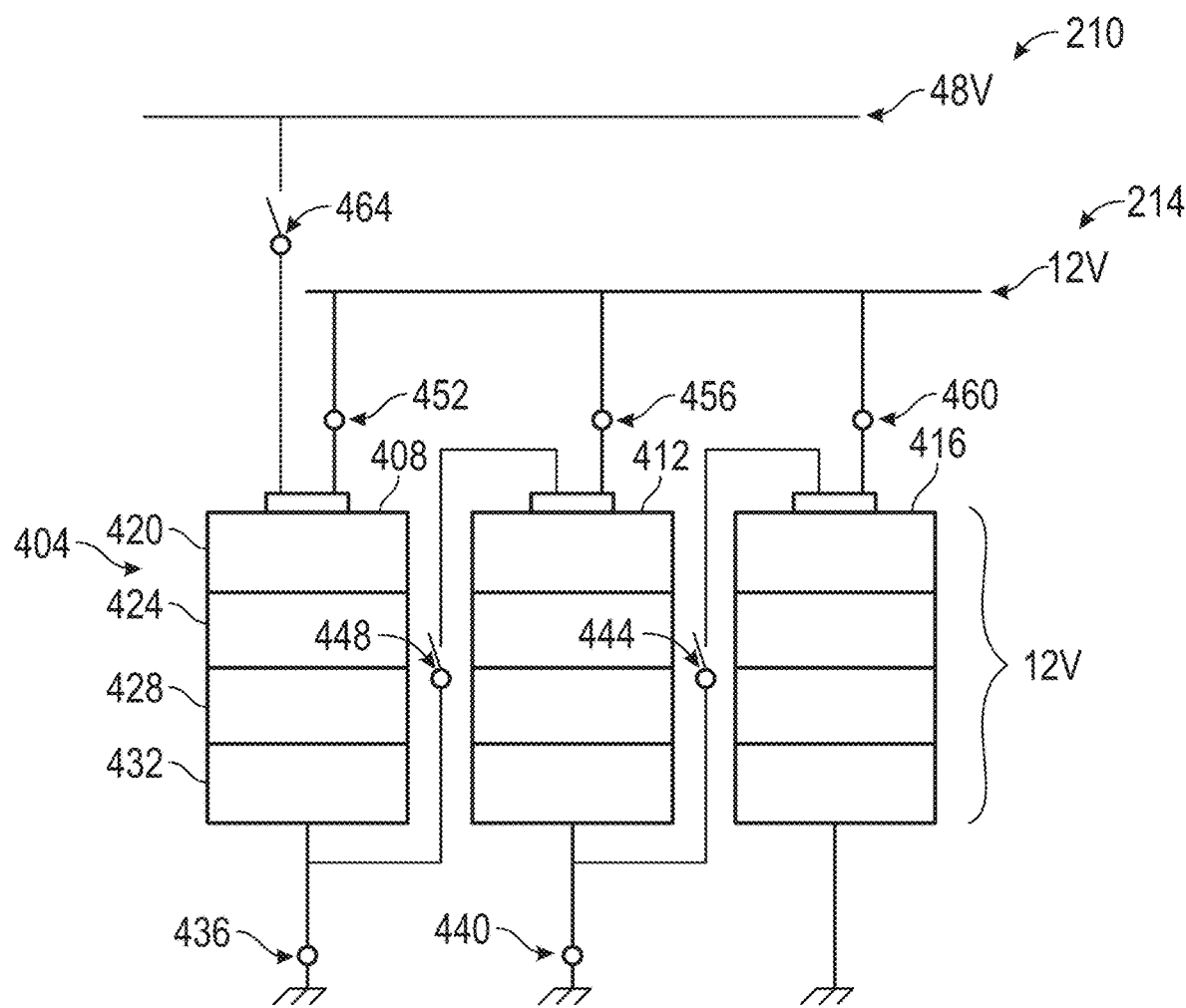
FIG. 6 includes an example illustration of the battery module in a parallel configuration.

FIG. 6 includes an example illustration of the battery module 404 in the parallel (P) configuration. When a battery module is in the parallel (P) configuration, all the battery strings of the battery module are connected in parallel to the second positive terminal 214. This is accomplished by closing switches 452, 456, 460, 436, and 440, and opening all of the other switches 444, 448, and 464. None of the battery strings is connected to the first positive terminal 210 when the battery module is in the parallel (P) configuration.

As illustrated in FIG. 2, each of the battery modules 224 also includes a plurality of temperature sensors, such as temperature sensors 250-1, . . . , 250-N. For example, one battery temperature sensor may be provided for each battery string and measure a temperature of that battery string.

Figure 7:
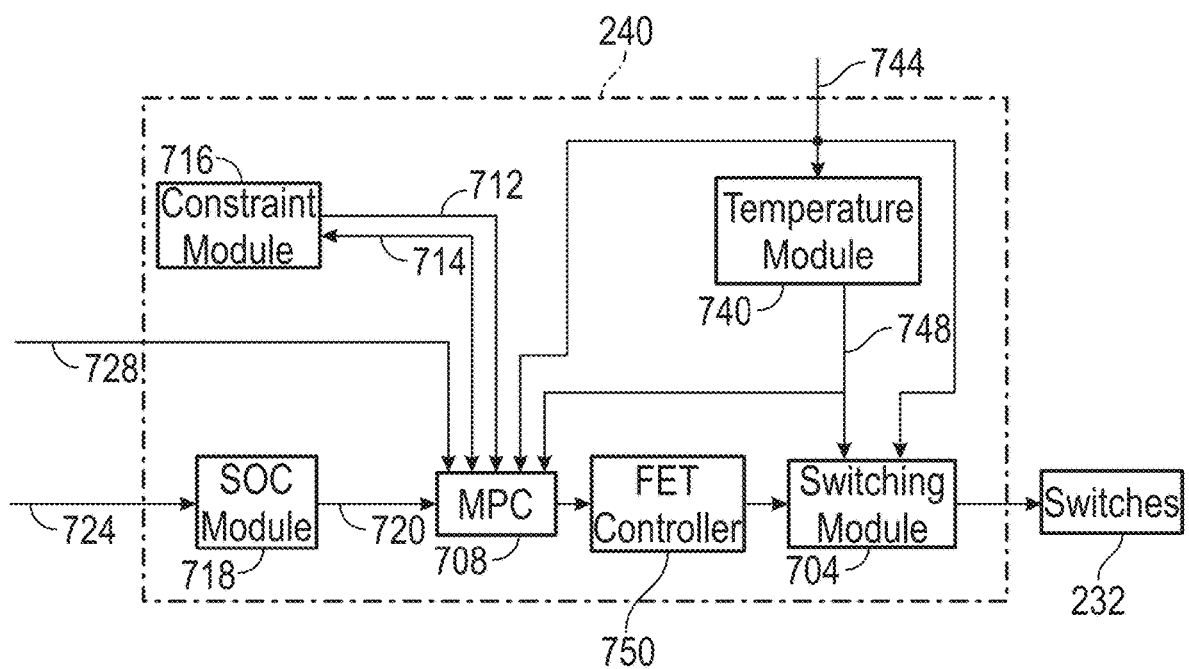
FIG. 7 is a functional block diagram of an example implementation of the switch control module.

FIG. 7 is a functional block diagram of an example implementation of the switch control module 240. A switching module 704 applies signals to (e.g., gate terminals) of the switches 232 (the sets of switches) of the battery modules 224 to control actuation of the switches 232 and to control whether each of the battery modules 224 is in the open (X) state, the series (S) state, or the parallel (P) state.

The switching module 704 applies the signals based on input from a FET controller 750. The FET controller 750 receives MPC switch control from a model predictive controller (MPC 708) and determines the suitability of the MPC switch control for use at the switching module 704. The FET controller 750 will select, based on various criteria, whether to implement either the MPC switch control or a predefined set of switch controls (a default switching control) at the switching module 704. While the example of the MPC 708 is provided, another type of balancing control module may be used.

The MPC 708 determines a predicted power mode over a prediction horizon (e.g., the next 9 seconds or another suitable period), an actual/target present power mode, phase durations, and string and module connection and disconnection times based on one or more operating parameters and generates the output for the FET controller 750. The MPC 708 generates the output further based on constraints 712 set by a constraint module 716. Examples of the constraints 712 include, for example, a battery string cannot be connected to either the first or second positive terminal 210 and 214 when its battery module is in the X connection. A battery string cannot be connected to both the first and second positive terminals 210 and 214 at the same time. A battery string cannot be connected multiple times to the second positive terminal 214 when that battery module is to be connected in the parallel (P) mode. Phase durations may be constrained to meet the demand at the first positive terminal 210. The duration of connection of each string may not be limited (constrained) to the end of the phase. The number of channels (battery strings) per battery module may be constrained to meet a demand at the second positive terminal 214. The MPC 708 may therefore provide MPC switch control that, when implemented by the FET controller 750 at the switching module 704, better and more quickly balance the SOCs of the battery strings and the battery modules.

One, more than one, or all of the constraints 712 may be fixed. In various implementations, one or more of the constraints 712 may be variable. The constraints module 716 may set variable constraints based on one or more operating parameters 714. Examples of the operating parameters 714 include, for example, the present power mode, the predicted power mode, a predicted duration of the present power mode, and other example operating parameters.

The MPC 708 may determine or predict the periods of the phases, the periods of connections of the modules, and the periods of the strings based on the operating parameters 714, as stated above. For example, the MPC 708 may determine the periods of the phases, the periods of the strings, and the periods of connections of the modules using lookup tables that relate the operating parameters to the periods, respectively. The MPC 708 can provide the determined periods of the phases, the periods of the strings, and the periods of connections of the modules to the FET controller 750.

A state of charge (SOC) module 718 determines a present state of charge (SOC) 720 of each of the battery strings. In other words, the SOC module 718 determines present SOCs 720 of the battery strings, respectively. The SOC module 718 may determine the present SOC of a battery string, for example, based on at least one of a voltage across the battery string and current to and from that battery string. The SOC module 718 may determine the present SOC of a battery string using at least one of an equation and a lookup table that relates voltage and/or current to SOC. In various implementations, the SOC module 718 may determine the SOC of a battery string based on impedance of the battery string, such as to more precisely relate voltage and current to SOC. The SOC module 718 does this for each battery string. Parameters 724, such as temperatures, voltages, and currents of the battery strings may be measured using temperature, voltage, and current sensors, respectively.

The MPC 708 may send the MPC switching control to the FET controller 750 for switching of the switches (via the switching module 704) to minimize an error (e.g., a sum of squared errors) between the SOCs of the battery strings, respectively, for the present power mode. The MPC switching control can be based on present output demands via the first and second positive terminals 210 and 214 and predicted output demands from the first and second positive terminals 210 and 214. The present and predicted output demands are illustrated by 728.

When determining MPC switching control for balancing the SOCs 720 of the strings using MPC, the MPC 708 sets phase durations for each of three phases (phase 1, phase 2, and phase 3), a number of battery strings connected when in the P mode, and a duration that each of the battery strings is connected in the P mode. The durations of the phases may be set to different lengths based on string and/or module SOC balancing. Each power mode has an associated set of configurations (X mode, P mode, or S mode) of the battery modules 224 for that power mode. Table 1 (below) illustrates power modes and the battery module modes for each phase. The MPC 708 cycles through the phases (phase 1, phase 2, phase 3, then back to phase 1, etc.) repeatedly until the power mode is changed.

TABLE 1

| Mode # | Phase 1 | Phase 2 | Phase 3 |
|---|---|---|---|
| 1 (XXX) | XXX | XXX | XXX |
| 2 (XXP) | XXP | PXX | XPX |
| 3 (XXS) | XXS | SXX | XSX |
| 4 (XPP) | XPP | PXP | PPX |
| 5 (XPS) | XPS | SXP | PSX |
| 6 (XSS) | XSS | SXS | SSX |
| 7 (PPP) | PPP | PPP | PPP |
| 8 (PPS) | PPS | SPP | PSP |
| 9 (PSS) | PSS | SPS | SSP |
| 10 (SSS) | SSS | SSS | SSS |
| 11 (S'S'S') | S'S'S' | S'S'S' | S'S'S' |

In the example table above, the battery module mode of the respective battery modules are provided for each phase. For example, when in power mode 5 (SXP mode), during the first phase (phase 1), the first battery module is operated in the series (S) mode, the second battery module is operated in the open (X) mode, and the third battery module is operated in the parallel (P) mode. Only 1 of the strings of the third battery module (being operated in the P mode) can be disconnected before the end of the first phase to better balance the strings of the third battery module. During the second phase (phase 2) of power mode 5, the first battery module is operated in the parallel (P) mode, the second battery module is operated in the series (S) mode, and the third battery module is operated in the open (X) mode. Only 1 of the strings of the first battery module (being operated in the P mode) can be disconnected before the end of the second phase to better balance the strings of the first battery module. During the third phase (phase 3) of power mode 5, the first battery module is operated in the open (X) mode, the second battery module is operated in the parallel (P) mode, and the third battery module is operated in the series (S) mode. Only 1 of the strings of the second battery module (being operated in the P mode) can be disconnected before the end of the third phase to better balance the strings of the second battery module.

The MPC 708 may set the duration (length) of each of the first, second, and third phases based on balancing of the SOCs of each battery string and each battery module. For example, in the XXP mode, the battery strings (e.g., on average) of one battery module have lower SOCs than the other two battery modules, during charging the MPC 708 may set the phase or phases that the one battery module is operated in the parallel (P) mode to be longer than the phase or phases that the other two battery modules. This will increase the SOCs of the other two battery modules less than the SOC of the one of the battery modules such that the SOCs are more balanced across the battery modules. During discharging, the battery strings (e.g., on average) of one battery module have lower SOCs than the other two battery modules, the MPC 708 may set the phase or phases that the one battery module is operated in the parallel (P) mode to be shorter than the phase or phases that the other two battery modules. This will decrease the SOCs of the other two battery modules more than the SOC of the one of the battery modules such that the SOCs are more balanced across the battery modules.

The MPC 708 may set the duration (length/period) of each phase that each battery string is connected to the second positive terminal 214 to balance the individual SOCs of the battery strings of each module. For example, during charging, when one battery string of a battery module has a SOC that is lower than the other battery strings of that battery module, the MPC 708 may set the duration for the one of the battery strings to be connected to the second positive terminal 214 to longer than the durations of the other battery strings of the battery module. This will increase the SOC of the one battery string of the battery module more than the SOCs of the other battery strings of the battery module such that the SOCs are more balanced within the battery module. The MPC 708 does this for each battery module. During discharging, when one battery string of a battery module has a SOC that is lower than the other battery strings of that battery module, the MPC 708 may set the duration for the one of the battery strings to be connected to the second positive terminal 214 to shorter than the durations of the other battery strings of the battery module. This will decrease the SOC of the one battery string of the battery module less than the SOCs of the other battery strings of the battery module such that the SOCs are more balanced within the battery module. The MPC 708 does this for each battery module when operated in the parallel (P) mode.

As another example, during charging, when one battery string of a battery module has a SOC that is higher than the other battery strings of that battery module, the MPC 708 may set the duration for the one of the battery strings to be connected to the second positive terminal 214 such that the one of the battery strings is disconnected prior to the end of the phase (i.e., to shorter than the phase) and the other two battery strings to the second positive terminal 214 are connected for the entirety of the phase (i.e., to the length of the phase). This will increase the SOC of the one battery string of the battery module to a lesser extent than the SOCs of the other battery strings of the battery module such that the SOCs are more balanced within the battery module. The MPC switching control does this for each battery module. During discharging, when one battery string of a battery module has a SOC that is lower than the other battery strings of that battery module, the MPC 708 may set the duration for the one of the battery strings such that the one of the battery strings is disconnected prior to the end of the phase (i.e., to shorter than the phase) and the other two battery strings to the second positive terminal 214 are connected for the entirety of the phase (i.e., to the length of the phase). This will decrease the SOC of the one battery string of the battery module to a lesser extent than the SOCs of the other battery strings of the battery module such that the SOCs are more balanced within the battery module. The MPC switching control does this for each battery module when operated in the parallel (P) mode.

Figure 8:
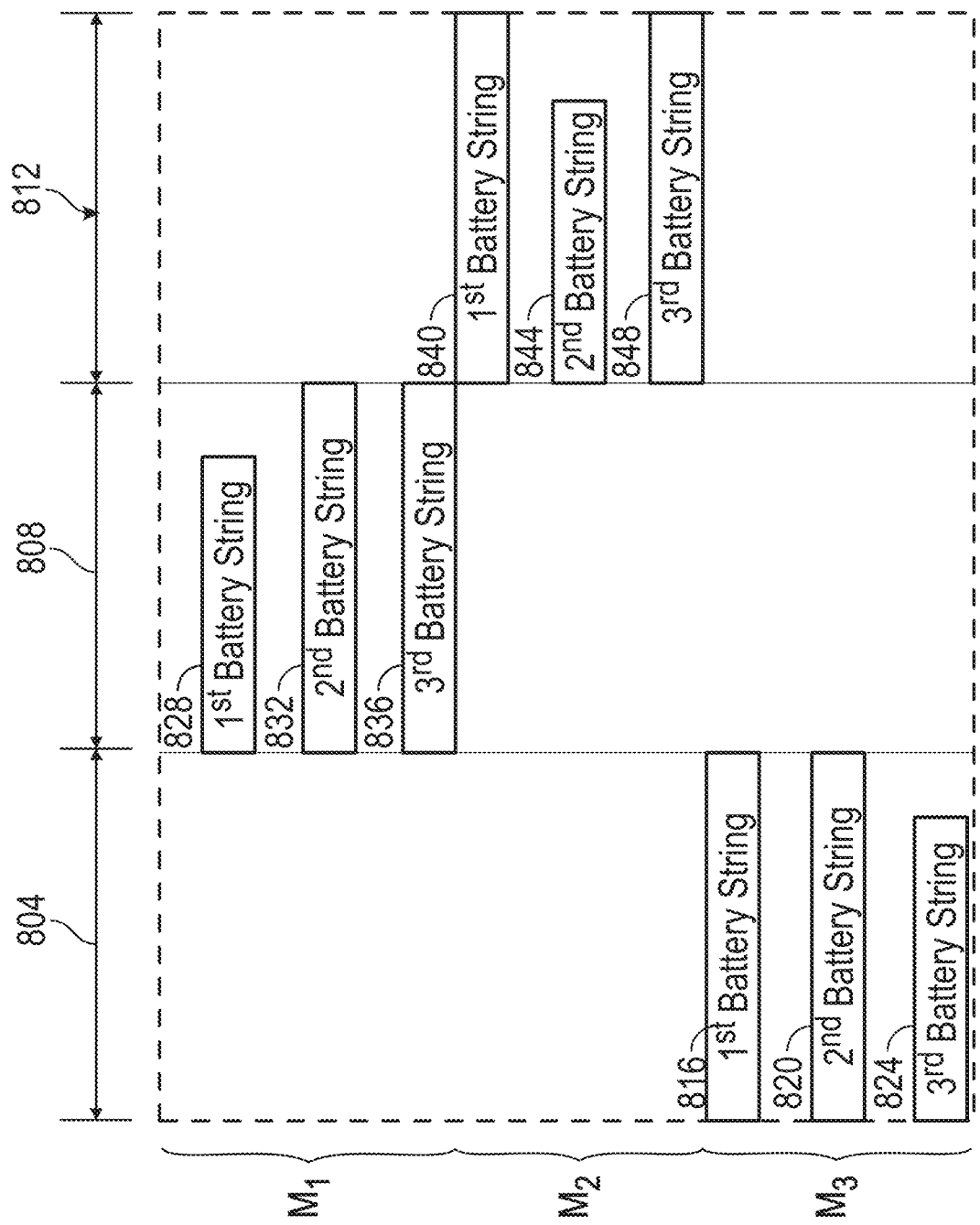
FIG. 8 includes an example timeline for operation an SXP power mode during charging or discharging using model predicted control switching.

FIG. 8 includes an example timeline for operation in power mode 5 (SXP) when the battery 208 is charging through the second positive terminal 214 while charging or discharging through the first positive terminal 210, such as with a small current. The timeline shown in FIG. 8 is an illustrative timeline that can occur when the FET controller 750 uses the MPC switching control provided by the MPC 708. The timeline shows a first phase 804 (phase 1), a second phase 808 (phase 2), and a third phase 812 (phase 3). As used herein, the MNO mode may mean that the first battery module is operating in mode M, the second battery module is operating in mode N, and the third battery module is operating in mode O, where M, N, and O are each one of parallel (P), series (S), or open (X). For example, the first phase includes SXP mode where the first battery module is operated in the series (S) mode, the second battery module is operated in the open (X) mode, and the third battery module is operated in the parallel (P) mode. The second phase includes operation in the PSX mode where the first battery module is operated in the parallel (P) mode, the second battery module is operated in the series (S) mode, and the third battery module is operated in the open (X) mode. The third phase includes operation in the XPS mode where the first battery module is operated in the open (X) mode, the second battery module is operated in the parallel (P) mode, and the third battery module is operated in the series (S) mode.

In the example of FIG. 8, the MPC switching control sets the duration of the second phase to longer than the duration of the third phase, and the duration of the third phase to shorter than the duration of the first phase. During charging through the second positive terminal 214 allows for more charging of the battery strings of the first battery module (which is connected in the parallel (P) mode in the second phase) than the other battery modules and allows for less charging of the battery strings of the second battery module (which is connected in the parallel (P) mode in the third phase) than the battery strings of the third battery module. The third battery module is operated in the parallel (P) mode in the first phase.

During the first phase 804, the MPC switching control connects a third battery string 824 of a third battery module $M_3$ to the second positive terminal 214. The duration for which the third battery string 824 is connected to the second positive terminal 214 is less than the total duration of the first phase 804 and also of the duration of the connections of the first battery string 816 and second battery string 820 of the third battery module $M_3$. This allows the first and second battery strings 816 and 820 of the third battery module $M_3$ to be charged more than the third battery string 824 of the third battery module $M_3$, thereby balancing the SOCs of the first, second, and third battery strings 816, 820, and 824 of the third battery module.

During the second phase 808, the MPC switching control connects a first battery string 828 of the first battery module $M_1$ to the second positive terminal 214. The duration for which the first battery string 828 is connected to the second positive terminal 214 is less than the total duration of the second phase 808 and also of the duration of the connections of the second battery string 832 and third battery string 836 of the first battery module $M_1$. This allows the second and third battery strings 832 and 836 of the first battery module $M_1$ to be charged more than the first battery string 828 of the first battery module $M_1$, thereby balancing the SOCs of the first, second, and third battery strings 828, 832, 836 of the first battery module.

During the third phase 812, the MPC switching control connects a second battery string 844 of the second battery module $M_2$ to the second positive terminal 214. The duration for which the second battery string 844 is connected to the second positive terminal 214 is less than the total duration of the third phase 812 and also of the duration of the connections of the first battery string 840 and third battery string 848 of the second battery module. This allows the first and third battery strings 840 and 848 of the second battery module $M_2$ to be charged more than the second battery string 844 of the second battery module $M_2$, thereby balancing the SOCs of the first, second, and third battery strings 840, 844, 848 of the second battery module.

Control then returns to the first phase if the power mode has not changed. In other words, control continues from phase 1 to phase 2 to phase 3 before repeating phases 1-3 in the same order.

While FIG. 8 is discussed as illustrating charging, it can also be used to illustrate a discharging operation. For example, if the SOC of the third strings of the first, second, and third battery modules are lower than the SOCs of the first and second strings of the first-third battery modules, respectively, the MPC switching control may connect the third strings of the first-third battery modules during the respective phases to the second positive terminal 214 for shorter total periods than the first and second strings of the first-third battery modules. This discharges the third strings less than the first and second strings and balances the SOCs of the battery strings.

Figure 9:
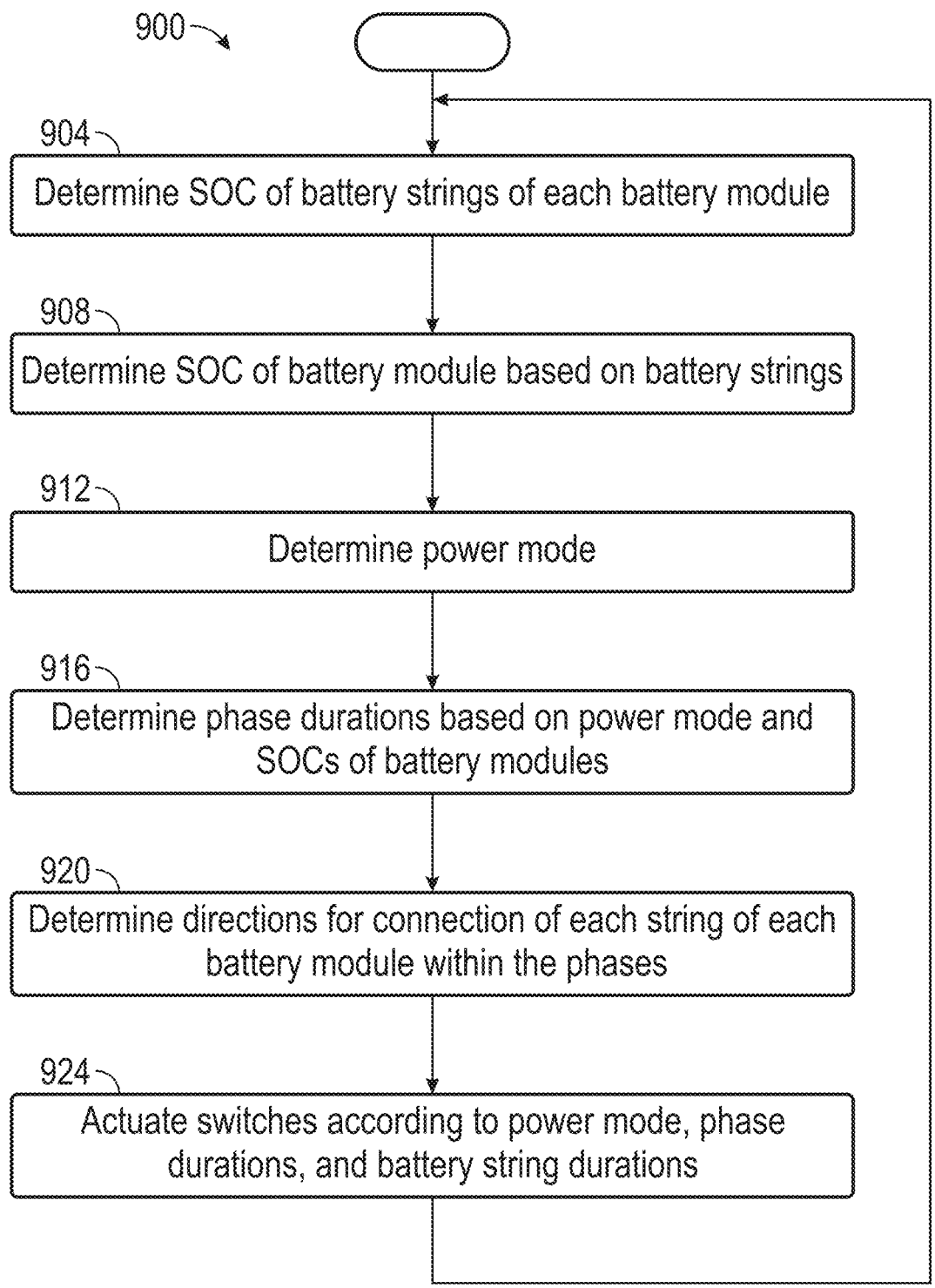
FIG. 9 is a flowchart depicting an example method of balancing charges of battery strings of battery modules of the battery using model predicted controller (MPC) switching control.

FIG. 9 is a flowchart 900 depicting an example method of balancing the SOCs of the battery strings of the battery modules of the battery 208 using MPC switching control (i.e., where the FET controller 750 implements the MPC switching control). Control begins with box 904 where the SOC module 718 determines the SOCs of the battery strings (first, second, and third) of each of the battery modules 224 (first, second, and third) of the battery 208.

At box 908, the SOC module 718 may determine SOCs of the battery modules (first, second, and third) based on the battery strings of the battery modules, respectively. For example, the SOC module 718 may determine an SOC of the first battery module based on an average of the SOCs of the battery strings (first, second, and third) of the first battery module. The SOC module 718 may determine an SOC of the second battery module based on an average of the SOCs of the battery strings (first, second, and third) of the second battery module. The SOC module 718 may determine an SOC of the third battery module based on an average of the SOCs of the battery strings (first, second, and third) of the third battery module.

At box 912, the MPC 708 determines the power mode, such as described above, based on the operating parameters and the demands. The MPC 708 may select one of the power modes above, such as the SXP mode, the XPP mode, the XXP mode, or another one of the modes above.

At box 916, the MPC 708 determines the phase durations (the periods of the first, second, and third phases) based on the power mode and the SOCs of the battery modules. For example, for discharging in the XXP mode, the MPC 708 may set the durations of a phase when a battery module is to be connected in the parallel (P) mode to shorter than the durations of the other phases when the SOC of that battery module is less than the SOC of the other battery modules. The MPC 708 determines the phase durations using MPC, and the phase durations may be different. In other words, the phase durations are not constrained (via the constraints 712) to be the same.

At box 920, the MPC 708 determines durations for connection of each string of each battery module within the phases. As discussed above, only one string of a battery module to be operated in the P mode during a phase may be disconnected before the end of the phase. For example, during charging in the P mode, the MPC switch control may include charging two battery strings longer (until the end of a phase) than other battery string (disconnect before the end of the phase) when the battery strings have lower SOCs than the other battery string. During discharging, the MPC switch control may include discharging battery strings longer than the other battery string when the battery strings have higher SOCs than the other battery string. The MPC 708 determines the battery string durations using MPC and, via the constraints 712, can provide MPC switch control to set only one of the battery strings of a battery module to be disconnected prior to the end of a phase during which that battery module is to be operated in the P mode.

In various implementations box 912 and box 916 may be performed concurrently by the MPC switch control from the MPC 708. The optimization cost criterion may be zero when all string SOCs are equal and may become larger with larger differences between the SOCs. One possible formulation of such a cost criterion is a weighted sum of squared differences between the SOCs of neighboring pairs in a cyclic chain that includes all of the strings, this sum taken over a planning horizon consisting of one or more complete cycles through the three phases. Additional penalties may be added such as a cost on the total connection times of strings with the purpose of avoiding overheating any string. The variables in the optimization are the durations of the phases and the duration that each string is connected in P configuration. Minimization of the cost criterion is subject to the constraints 712. Violation of a constraint increases the cost of a possibility and thus prevents the possibility from being selected and used. Given the output demands and predictions 728, the cost criterion can be evaluated by the MPC 708 for any set of connection durations. The solution of the minimization problem is the set of phase durations and string connection durations that most nearly balance the string SOCs over the planning horizon, subject to the constraints 712 and taking into account any additional penalty terms.

At box 924, the switching module 704 actuates the switches 232 according to the power mode, the phase durations, and the battery string durations. Control returns to box 904 for a next loop.

Charging or discharging of one battery string or battery module for longer than another battery string of that battery module or other battery modules increases the temperature of that battery string or battery module relative to the other battery strings or battery modules. The temperatures of the battery modules and battery strings may naturally diverge to meet multiple power demands from the output terminals that may change quickly.

Referring back to FIG. 7, the switch control module 240 may also include a temperature module 740 that receives the temperatures 744 of the battery strings, respectively. As discussed above, the temperatures 744 of the battery strings may be measured using temperature sensors, respectively. The temperature module 740 determines temperatures 748 of the battery modules (module temperatures), respectively. The temperature module 740 determines the temperature 748 of a battery module based on the temperatures 744 of the battery strings of that battery module. For example, the temperature module 740 may set the temperature 748 of a battery module based on or equal to an average of the temperatures 744 of the battery strings of that battery module. The temperature module 740 may determine the temperature 748 of a battery module using one or more equations and/or lookup tables that relate battery string temperatures to battery module temperature. The temperature module 740 determines the temperature 748 of each battery module.

The switching module 704 may control switching of the switches 232 further based on the temperatures 744 of the battery strings, respectively, and/or the temperatures 748 of the battery modules, respectively. In various implementations, the MPC switching control from the MPC 708 may include adjusting the mode based on the temperatures 744 of the battery strings, respectively, and/or the temperatures 748 of the battery modules, respectively. Generally stated, when using MPC switching control, the switching module 704 may control switching of the switches 232 based on balancing the temperatures 744 of the battery strings, respectively, of a battery module to balance the temperatures of the battery strings of that battery module. The switching module 704 may do this for each battery module. Using MPC switching control, the switching module 704 may also control switching of the switches 232 based on balancing the temperatures 748 of the battery modules, respectively, to balance the temperatures of the battery modules. The MPC 708 may provide MPC switch control to control switching of the switches (via the switching module 704) to minimize an error (e.g., a sum of squared errors) between the temperatures of the battery strings, respectively, for the present power mode. The MPC 708 may also provide MPC switch control to control switching of the switches (via the switching module 704) to minimize an error (e.g., a sum of squared errors) between the temperatures of the battery modules, respectively, for the present power mode.

Current flow to or from a battery string or battery module is one of the sources of heating the battery string or battery module (as well as external heating). The MPC 708 may provide MPC switch control to set the power mode based on heating one or more battery strings or battery modules more or less quickly to balance the temperatures of the battery strings or the battery modules.

Figure 10:
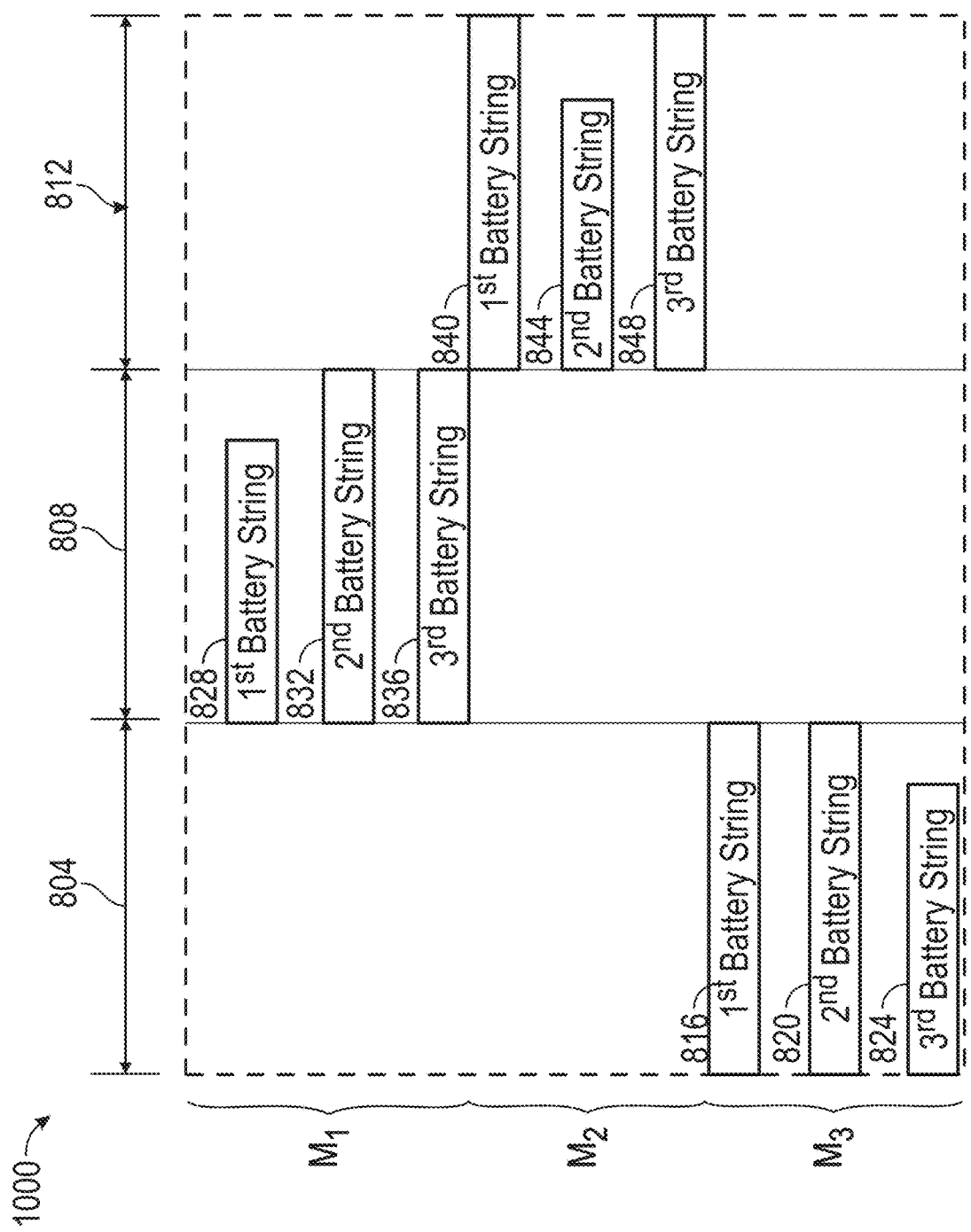
FIG. 10 shows a timeline of operation of strings in an SXP power during charging and discharging using a default switching control.

FIG. 10 shows a timeline 1000 of an operation of strings within a module in which the FET controller 750 implements a default switching control at the switching module 704. The timeline includes three phases: a first phase 804 (phase 1), a second phase 808 (phase 2) and a third phase 812 (phase 3). When using the default switching control, the first phase 804, second phase 808 and third phase 812 are equal in duration. Additionally, each string within a module remains in its connection state throughout the phase. The SXP mode used to illustrate operation of the default switching control.

During the first phase 804, the default switching control includes connecting the third battery string 824 of the third battery module $M_3$ to the second positive terminal 214. The first battery string 816, second battery string 820 and third battery string of the third battery module $M_3$ remain in their connection state for the same duration. Similarly, during the second phase 808, the default switching control includes connecting the first battery string 828 of the first battery module $M_1$ to the second positive terminal 214. The first battery string 828, second battery string 832 and third battery string 836 of the first battery module $M_1$ remain in their connection state for the same duration. Finally, during the third phase 812, the default switching control includes connecting the second battery string 844 of the second battery module $M_2$ to the second positive terminal 214. The first battery string 840, second battery string 844 and third battery string 848 remain in their connection state for the same duration. Control then returns to the first phase if the power mode has not changed. In other words, control continues from phase 1 to phase 2 to phase 3 before repeating phases 1-3 in the same order.

Figure 11:
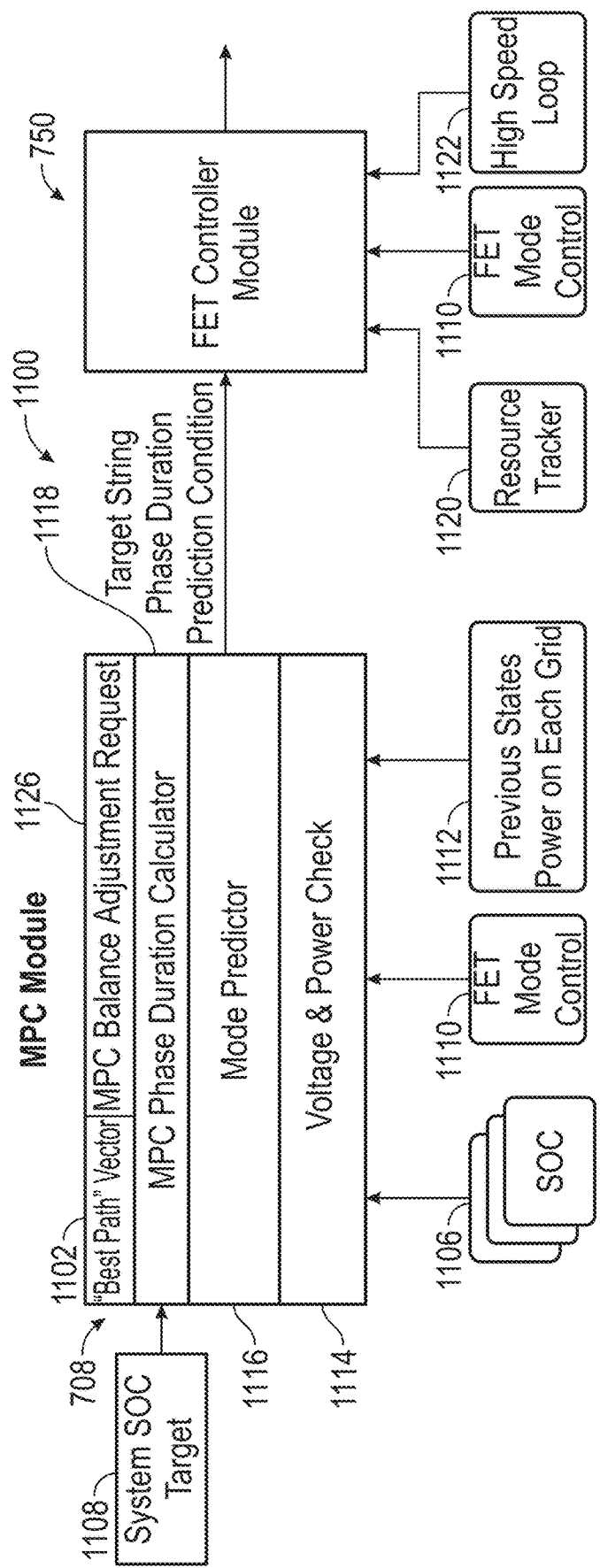
FIG. 11 shows a schematic diagram illustrating operation of a model predicted control and an FET controller.

FIG. 11 shows a schematic diagram 1100 of illustrating operation of the MPC 708 and the FET controller 750. The schematic diagram 1100 depicts an operation by which the FET controller 750 selects between the default switching control illustrated in FIG. 10 and a MPC switching control illustrated in FIG. 8. The MPC 708 and the FET controller 750 can operate on a processor of the vehicle 100. The MPC 708 determines SOC imbalances between strings and between modules and calculates a best path vector 1102 (i.e., MPC switching control) for reducing the SOC imbalances. The best path vector 1102 is a predicted path or protocol by which the SOCs of the strings and modules can be balanced during operation of the MODACS. The best path vector 1102 is parametrized by, for example, a predicted phase duration, a predicted charging condition (or discharging condition) and a target string selected for charging (or discharging). The best path vector 1102 is provided from the MPC 708 to the FET controller 750. The FET controller 750 selects between one of the best path vector 1102 and a default path vector (i.e., default switching control) for use in controlling the switching between the phases of a mode. The selection can be based on the various parameters, such as current power requirements and current temperature.

The best path vector 1102 is predicted or calculated based on parameters such as the SOC measurements 1106 (current SOC) of the modules and the strings, the target SOC values 1108 for the modules and strings, the current mode of operation, the current mode duration, string temperature, etc. The MPC 708 receives SOC measurements 1106 and target SOC values 1108. The SOC measurements 1106 include the current charge state of each of the energy storage strings. The target SOC values 1108 are intended SOC values for the energy storage strings. The MPC 708 is also receptive to a current FET control state 1110 and a previous states record 1112. The current FET control state 1110 indicates a switch mode control that is currently being implemented at the MODACS (i.e., default switching control or MPC switching control). The previous states record 1112 indicates previous power states for the string and modules of the MODACS and previous operations that were employed for these previous states. The previous states record 1112 can be used to help in predicting or suggesting an MPC switch control (i.e., best path vector 1102) for the current state of the MODACS. In particular, when calculating the best path vector 1102, the MPC 708 can employ the previous states record 1112 to predict the effect of applying a suggested path vector on the charge states of the strings and modules, thereby allowing the MPC 708 either to accept the suggested path vector as the best path vector or to make adjustments to the suggested path vector.

The MPC 708 operates a power check subroutine 1114, a mode prediction subroutine 1116, and a phase duration calculator 1118. The power check subroutine 1114 determines a power flow direction based on SOC measurements 1106 and the current FET control state 1110. The power check subroutine 1114 also checks that the power flow is in a correct direction for the current FET control state 1110. The mode prediction subroutine 1116 predicts a mode of operation of the MODACS based on the power conditions, and the previous states record 1112. The mode prediction subroutine 1116 calculates the best path vector 1102 and a balance adjustment request 1126. The best path vector 1102 generates a best or optimal protocol for switching string configurations based on a model used by the MPC 708. The balance adjustment request 1126 constantly monitors the charges on the strings and modules and provides an indication if the best path vector is still valid or not and if the best path vector needs to be revised.

The MPC 708 can choose to balance SOC in one of two ways. In a first method, the MPC 708 first reduces charge imbalances between strings within each of the plurality of battery modules and then reduces charge imbalances between the plurality of battery modules themselves. In a second method, the MPC 708 first reduces charge imbalances between the plurality of modules and then reduces charge imbalances between the strings within each of the plurality of modules.

The phase duration calculator 1118 calculates a model-predicted phase duration for the best path vector 1102. The model-predicted phase duration can be based on the magnitude of the SOC imbalances, which is determined using the SOC measurements 1106 (i.e., current SOC) on the strings and the target SOC values 1108.

The FET controller 705 receives, in addition to the best path vector 1102, data from the current FET control state 1110, a resource tracker data 1120, and a high-speed loop 1122. The high-speed loop 1122 monitors the voltage, current and temperature of the MODALS, its strings and modules. The resource tracker 1120 tracks acceptable power conditions and temperature limits for the MODALS, including its strings and modules. The FET controller 750 compares the current voltage, power, temperature, etc., to the power conditions and temperature limits to determine whether the best path vector 1102 satisfies power and temperature requirements for the MODALS. If the best path vector 1102 satisfies the power and temperature requirements, FET controller 750 can apply the best path vector. If the best bath vector 1102 does not satisfy the power and temperature requirements, the FET controller 750 can apply the default vector. If the best path vector 1102 is currently being applied and the current power and temperature changes so as to no longer satisfy the power and temperature requirements, the FET controller 750 can stop applying the best path vector and instead switch to applying the default vector. This switch can occur mid-phase.

It is noted that if switching occurs too quickly, this can lead to switching-related power loss. In such instances, the FET controller 750 can select to use the default vector.

Figure 12:
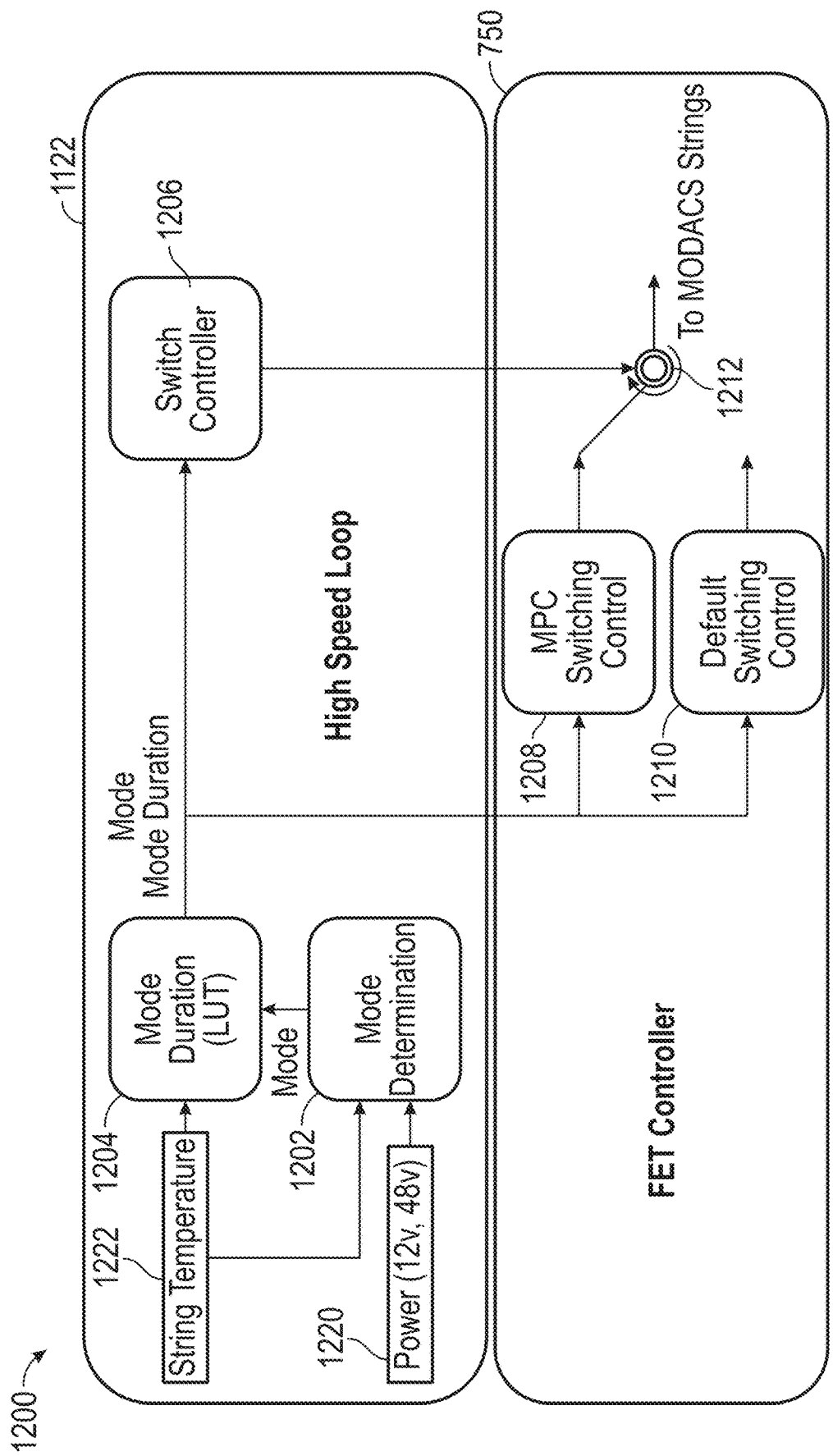
FIG. 12 depicts a schematic diagram illustrating operation between a high-speed loop and the FET controller, in an embodiment.

FIG. 12 depicts a schematic diagram 1200 illustrating operation between the high-speed loop 1122 and the FET controller 750, in an embodiment. The high-speed loop 1122 includes a mode determination module 1202, a mode duration module 1204, and a switch controller 1206. The FET controller 750 includes an MPC switching control module 1208, a default switching control module 1210, and a control selection switch 1212.

The mode determination module 1202 receives input in the form of power output 1220 (including current output and voltage output) and the string temperatures 1222 and determines a current mode of operation of the MODACS based on this input. The current mode is provided from the mode determination module 1202 to the mode duration module 1204. The mode duration module 1204 calculates a mode duration based on the current mode and string temperatures 1222. The current mode and the current mode duration are provided to the switch controller 1206 as well as to the MPC switching control module 1208 and the default switching control module 1210. The switch controller 1206 selects a switch configuration for the control selection switch 1212 based on the current mode and the current mode duration. The switch controller 1206 can base its selection on whether the mode duration requires rapid switching, which can lead to power loss, or on whether a selection produces a violation in the operation of the MODACS. In a first configuration, the control selection switch 1212 connects the MPC switching control module 1208 to the MODACS to switch the configuration of the strings using the model-predicted vector (i.e., the best path vector 1102). In a second configuration, the control selection switch 1212 connects the default switching control module 1210 to the MODACS to switch the configuration of the strings using the default vector. The control selection switch 1212 can be a mechanical switch, an electrical switch or fuse, or a subroutine in software operating at the processor.

Figure 13:
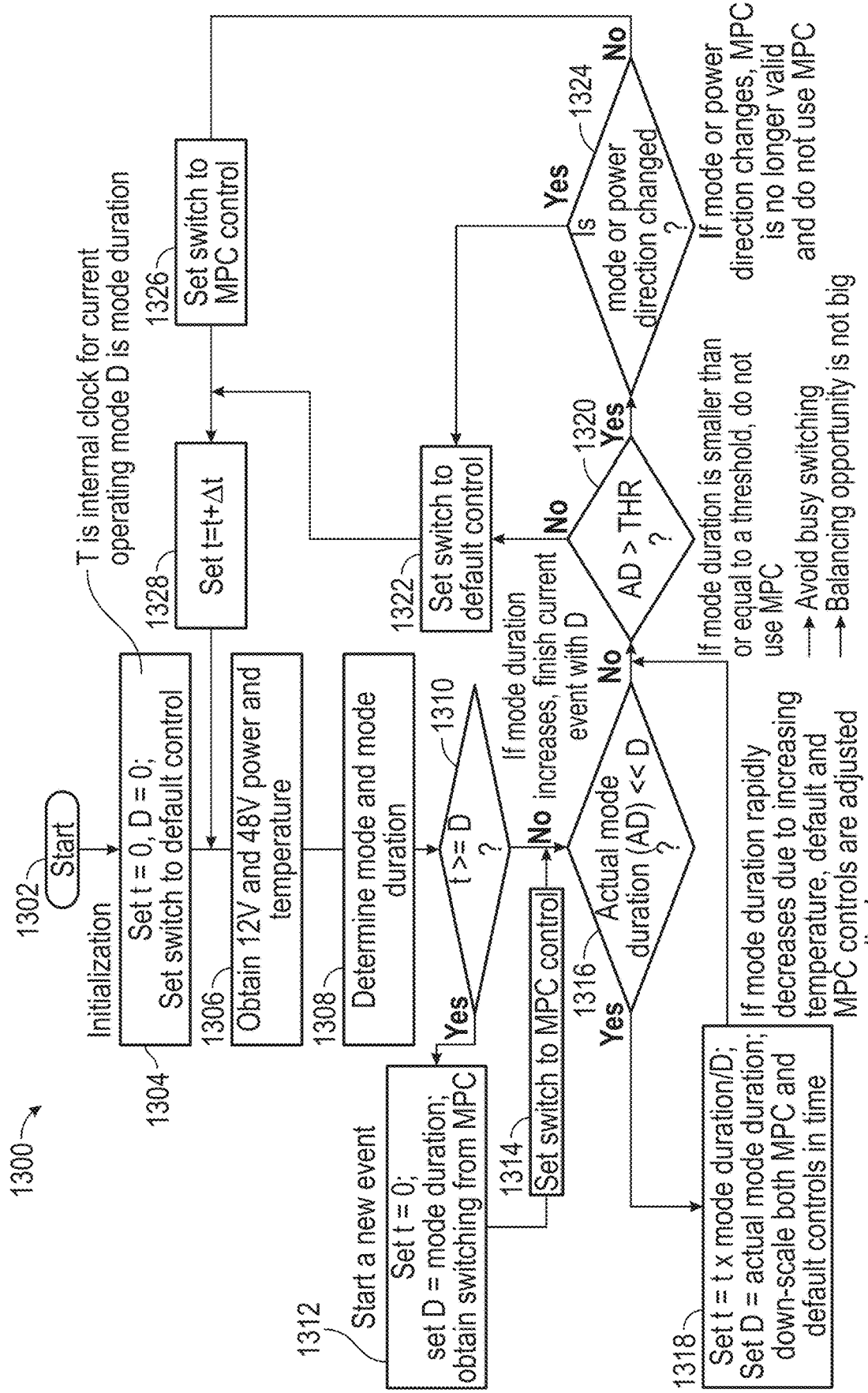
FIG. 13 shows a flowchart of a method for selecting between a default control switching mode and an MPC switching mode.

FIG. 13 shows a flowchart 1300 of a method for selecting between a default control switching mode and an MPC switching node. The method starts at box 1302. In box 1304, a timer t and a pre-set mode duration D are initialized to zero (t=0, D=0). The control selection switch 1212 is flipped to connect the default switching control module 1210 to the MODACS for switching the strings. In box 1306, measurements are taken of the 12V bus line power and 48V bus line power as well as string temperatures. In box 1308, and the operating mode is determined and a mode duration is calculated for the MODACS.

In box 1310, a decision is made for whether to switch to using the MPC switching control. If t>=D, then the method proceeds to box 1312. Otherwise, the method process to box 1316. In a first pass through box 1310, D=0 so the method proceeds to box 1312. In box 1312, the timer is reset (t=0) and D is set to a preselected duration value (e.g., D=9 seconds). The FET controller 750 then obtains the switching control from the MPC 708. In box 1314, the FET controller 750 implements the MPC switching control for changing switching configurations at the MODACS.

In box 1316, a decision is made based on an actual mode duration AD determined based on real-time operating condition and the preselected duration D. An increase in temperature at the strings will reduce the AD actual mode duration from the preselected duration D. If the actual mode duration AD becomes less than the preselected value by given amount (e.g., AD is less than 50% of D), the method proceeds to box 1318. Otherwise, the method proceeds to box 1320.

In box 1318, the preset mode duration D is reduced by being set to the actual mode duration AD. The reduced mode duration is then used to scale down or reduce the corresponding phase durations that are associated with the mode. The phase durations are reduced for both the default switching control and the MPC switching control. From box 1318, the method proceeds to box 1320.

In box 1320, the actual mode duration AD is compared to a threshold value THR. The threshold value is a minimum time for phase switching. When the actual mode duration AD is less than THR, the use of MPC switching control is no longer a valid option. Switching between phases at a pace that is too fast can also lead to electrical losses. Therefore, the threshold value THR is used to prevent the phase switching from occurring too quickly.

If the actual mode duration AD is less than or equal to the threshold value THR, then the method proceeds to box 1322, in which the control selection switch 1212 is flipped to select the default switching control module 1210.

Returning to box 1320, if the actual mode duration AD is greater than the threshold value THR, the method proceeds to box 1324. In box 1324, the MODACS is monitored to determine if the power direction has changed or if use of the MPC switching control is no longer valid. The use of MPC switching control is pre-determined based on the operating condition at the beginning of the mode and is based on an assumption that the operating conditions will not change until the end of the mode is reached. Thus, if operating conditions change during the mode, the use of MPC switching control is no longer valid. For example, the MPC 708 can predict charging of the strings, whereas charging is actually occurring. Also, the detected power conditions may not be able to be met by using the MPC switching control, making use of the MPC switching control invalid Lastly, the phase durations suggested by the MPC 708 may exceed the allowable range of phase durations, thereby making use of the MPC switching control invalid. If the mode or power direction has changed, the method proceeds to box 1322 and the default switching control module 1210 is selected. Otherwise, the method proceeds to box 1326, in which the MPC switching control module 608 is selected.

From either box 1322 or box 1326, the method proceeds to box 1328. In box 1328, the timer is increased by a time step (Δt). The method then proceeds back to box 1306 to repeat the selection cycle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a battery having a plurality of modules, each module having a plurality of strings, comprising:
   operating the plurality of modules in a first phase of a mode of operation;
   calculating a model-predicted path vector for the first phase based on a charging or discharging the strings for reducing a difference between states of charge of the plurality of strings;
   selecting between the model-predicted path vector and a default path vector based on an operating parameter of the battery; and
   switching an operation of the plurality of modules from the first phase to a second phase using the selected one of the model-predicted path vector and the default path vector.

2. The method of claim 1, further comprising selecting the model-predicted path vector when the use of the model-predicted path vector satisfies a power requirement of the battery.

3. The method of claim 2, further comprising selecting the default path vector when the use of the model-predicted path vector does not satisfy the power requirement of the battery.

4. The method of claim 2, wherein the power requirement is based on a switching frequency at which switching power loss occurs.

5. The method of claim 1, wherein the operating parameter includes at least one of a temperature of the battery and a power demand on the battery.

6. The method of claim 1, wherein switching the operation of the plurality of modules from the first phase to a second phase further comprises flipping a switch between a first configuration that connects a default switching control module to the battery and a second configuration that connects a model-predicted switching control module to the battery.

7. The method of claim 1, further comprising selecting the default path vector when at least one of: (i) a mode of operation changes; and (ii) a direction of power changes.

8. A system for operating a battery having a plurality of modules, each module having a plurality of strings, comprising:
   a processor configured to:
   operate the plurality of modules in a first phase of a mode of operation;
   calculate a model-predicted path vector for the first phase based on a time for reducing a difference between states of charges of the plurality of strings;
   select between the model-predicted path vector and a default path vector based on an operating parameter of the battery; and switch operation of the plurality of modules from the first phase to a second phase using the selected one of the model-predicted path vector and the default path vector.

9. The system of claim 8, wherein the processor is further configured to select the model-predicted path vector when the use of the model-predicted path vector satisfies a power requirement of the battery.

10. The system of claim 9, wherein the processor is further configured to select the default phase vector when the use of the model-predicted path vector does not satisfy the power requirement of the battery.

11. The system of claim 9, wherein the power requirement is based on a switching frequency at which switching power loss occurs.

12. The system of claim 8, wherein the operating parameter includes at least one of a temperature of the battery and a power demand on the battery.

13. The system of claim 8, wherein the processor is further configured to flipping a switch between a first configuration that connects a default switching control module to the battery and a second configuration that connects a model predicted switching control module to the battery.

14. The system of claim 8, wherein the processor is further configured to select the default path vector when at least one of: (i) a mode of operation changes; and (ii) a direction of power changes.

15. A vehicle, comprising:
a battery having a plurality of modules, each module having a plurality of strings; and
a processor configured to:
operate the plurality of modules in a first phase of a mode of operation;
calculate a model-predicted path vector for the first phase based on a time for reducing a difference between states of charges of the plurality of strings;
select between the model-predicted path vector and a default path vector based on an operating parameter of the battery; and
switch operation of the plurality of modules from the first phase to a second phase using the selected one of the model-predicted path vector and the default path vector.

16. The vehicle of claim 15, wherein the processor is further configured to select the model-predicted path vector when the use of the model-predicted path vector satisfies a power requirement of the battery.

17. The vehicle of claim 16, wherein the processor is further configured to select the default phase vector when the actual mode duration use of the model-predicted path vector does not satisfy the power requirement of the battery.

18. The vehicle of claim 17, wherein the power requirement is based on a switching frequency at which switching power loss occurs.

19. The vehicle of claim 15, wherein the operating parameter includes at least one of a temperature of the battery and a power demand on the battery.

20. The vehicle of claim 15, wherein the processor is further configured to flipping a switch between a first configuration that connects a default switching control module to the battery and a second configuration that connects a model predicted switching control module to the battery.

* * * * *